US010406791B2

(12) United States Patent
Murray et al.

(10) Patent No.: US 10,406,791 B2
(45) Date of Patent: Sep. 10, 2019

(54) COMPOSITE INSULATING FILM

(75) Inventors: Thomas James Murray, Chesterfield, MO (US); Mark Gerard Winkeler, Maryville, IL (US); Heta S. Rawal, St. Louis, MO (US)

(73) Assignee: Elantas PDG, Inc., St. Louis, MO (US)

( * ) Notice: Subject to any disclaimer, the term of this patent is extended or adjusted under 35 U.S.C. 154(b) by 695 days.

(21) Appl. No.: 13/464,395

(22) Filed: May 4, 2012

(65) Prior Publication Data
US 2012/0286620 A1 Nov. 15, 2012

Related U.S. Application Data

(60) Provisional application No. 61/485,180, filed on May 12, 2011.

(51) Int. Cl.
| | |
|---|---|
| *B32B 27/28* | (2006.01) |
| *B32B 27/36* | (2006.01) |
| *B32B 27/08* | (2006.01) |
| *B32B 27/34* | (2006.01) |
| *H01B 3/30* | (2006.01) |
| *H01B 3/42* | (2006.01) |
| *C09D 179/08* | (2006.01) |
| *C08G 73/14* | (2006.01) |

(52) U.S. Cl.
CPC ............ *B32B 27/281* (2013.01); *B32B 27/08* (2013.01); *B32B 27/28* (2013.01); *B32B 27/285* (2013.01); *B32B 27/286* (2013.01); *B32B 27/34* (2013.01); *B32B 27/36* (2013.01); *C08G 73/14* (2013.01); *C09D 179/08* (2013.01); *H01B 3/306* (2013.01); *H01B 3/423* (2013.01); *B32B 2250/24* (2013.01); *B32B 2250/40* (2013.01); *B32B 2255/00* (2013.01); *B32B 2255/10* (2013.01); *B32B 2255/26* (2013.01); *B32B 2307/20* (2013.01); *B32B 2307/206* (2013.01); *B32B 2457/00* (2013.01); *B32B 2457/04* (2013.01); *Y10T 29/49227* (2015.01); *Y10T 428/24967* (2015.01); *Y10T 428/31533* (2015.04); *Y10T 428/31721* (2015.04); *Y10T 428/31725* (2015.04); *Y10T 428/31786* (2015.04)

(58) Field of Classification Search
CPC ........ C09D 179/08; H02K 15/10; H02K 3/32; H02K 3/34; H02K 3/345; B32B 27/08; B32B 27/281; B32B 27/36; B32B 2307/206; B32B 27/28; B32B 27/03; B32B 7/12; B32B 2250/24; B32B 2250/40; B32B 2255/00; B32B 2255/10; B32B 2255/26; B32B 2307/20; B32B 2457/00; B32B 2457/04; B32B 27/285; B32B 27/286; B32B 27/34; H01B 3/423; H01B 3/306; H01B 3/002; Y10T 428/31533; Y10T 428/31725; Y10T 428/31786; Y10T 29/49227; Y10T 428/24967; Y10T 428/31721; C08G 73/14
USPC .......... 427/385.5; 428/220, 473.5, 215, 335; 156/246; 29/887; 310/215; 442/59; 524/606
See application file for complete search history.

(56) References Cited

U.S. PATENT DOCUMENTS

| | | | | |
|---|---|---|---|---|
| 2,936,296 A | * | 5/1960 | Fox et al. ...................... | 524/352 |
| 3,392,144 A | | 7/1968 | Holub | |
| 3,511,728 A | | 5/1970 | Freedman et al. | |
| 3,682,960 A | | 8/1972 | Haller | |
| 3,922,465 A | | 11/1975 | Kawaguchi et al. | |
| 3,934,332 A | * | 1/1976 | Trunzo .................. | H01F 41/122 267/225 |
| 3,952,116 A | | 4/1976 | Trenkler et al. | |
| 4,092,442 A | | 5/1978 | Agnihotri et al. | |
| 4,095,205 A | * | 6/1978 | Schroeder ............. | H01F 27/324 174/110 PM |
| 4,180,614 A | | 12/1979 | Angelo et al. | |
| 4,258,155 A | | 3/1981 | Holub et al. | |
| 4,259,221 A | | 3/1981 | Pauze | |
| 4,332,925 A | | 6/1982 | Lee | |
| 4,346,136 A | * | 8/1982 | Lupinski ...................... | 428/213 |
| 4,378,407 A | | 3/1983 | Yamamoto et al. | |
| 4,481,339 A | | 11/1984 | Bolon | |
| 4,503,124 A | | 3/1985 | Keane et al. | |
| 4,505,978 A | | 3/1985 | Smith | |
| 4,521,956 A | | 6/1985 | Bell et al. | |

(Continued)

FOREIGN PATENT DOCUMENTS

| | | |
|---|---|---|
| EP | 0 125 599 A2 | 11/1984 |
| EP | 0 672 521 A1 | 5/1999 |

(Continued)

OTHER PUBLICATIONS

Murray, Thomas J.; "Poly(amide-imides): Wire Enamels with Excellent Thermal and Chemical Properties"; Macromolecular Materials and Engineering; 2008; pp. 350-360; Wiley-VCH Verlag GmbH & Co. KGaA; Weinheim.

(Continued)

*Primary Examiner* — John D Freeman
(74) *Attorney, Agent, or Firm* — Curatolo Sidoti Co., LPA; Salvatore A. Sidoti; Joseph G. Curatolo

(57) ABSTRACT

Provided is a flexible and self-supporting insulating film including a base polymer layer and a partially cured poly (amide)imide layer applied to the base polymer layer. The composite insulating film may be used as slot liner to provide insulation to the components of the electric motor. The partially cured poly(amide)imide layer of the composite insulation film maybe further cured by the heat generated by the operation of the electric motor.

6 Claims, 9 Drawing Sheets

(56) References Cited

U.S. PATENT DOCUMENTS

| | | |
|---|---|---|
| 4,716,079 A | 12/1987 | Sano et al. |
| 4,728,697 A | 3/1988 | Bolon et al. |
| 4,808,473 A | 2/1989 | Brooks |
| 4,980,447 A | 12/1990 | Khanna |
| 5,120,826 A | 6/1992 | Vora et al. |
| 5,137,985 A | 8/1992 | Chen, Sr. et al. |
| 5,917,155 A | 6/1999 | Hake et al. |
| 6,022,918 A | 2/2000 | Lienert et al. |
| 6,056,995 A | 5/2000 | Hake et al. |
| 6,121,553 A | 9/2000 | Shinada et al. |
| 6,129,982 A | 10/2000 | Yamaguchi et al. |
| 6,177,848 B1 | 1/2001 | Hopkinson et al. |
| 6,734,361 B2 | 5/2004 | Mesaki et al. |
| 6,811,875 B2 | 11/2004 | Kikuchi et al. |
| 6,914,093 B2 | 7/2005 | Xu |
| 7,221,068 B2 | 5/2007 | Yoshimura et al. |
| 7,851,705 B2 | 12/2010 | Obika |
| 2004/0076839 A1 | 4/2004 | Egitto et al. |
| 2004/0247907 A1 | 12/2004 | Goda et al. |
| 2005/0016658 A1* | 1/2005 | Asokan .......... H02K 3/30 156/53 |
| 2006/0248712 A1* | 11/2006 | Jo .............. H05K 1/0218 29/830 |
| 2007/0142616 A1 | 6/2007 | Murray et al. |
| 2007/0166559 A1 | 7/2007 | Tai et al. |
| 2008/0000599 A1 | 1/2008 | Yokura et al. |
| 2009/0294151 A1 | 12/2009 | Li et al. |
| 2010/0247906 A1* | 9/2010 | Lee et al. ............... 428/344 |
| 2010/0282488 A1 | 11/2010 | Zheng et al. |
| 2012/0123063 A1 | 5/2012 | Masaki et al. |
| 2012/0211258 A1 | 8/2012 | Nabeshima et al. |
| 2013/0068504 A1* | 3/2013 | Murray et al. ............ 174/209 |

FOREIGN PATENT DOCUMENTS

| | | |
|---|---|---|
| EP | 1447214 A1 | 8/2004 |
| EP | 2282622 A1 | 2/2011 |
| GB | 1394460 A | 5/1975 |
| GB | 1503013 | 3/1978 |
| GB | 2005109 | 2/1981 |
| GB | 1277834 | 6/1992 |
| JP | S57-50717 A | 3/1982 |
| JP | S62-66933 A | 3/1987 |
| JP | S62-291816 A | 12/1987 |
| JP | 2005-248134 A | 9/2005 |
| JP | 2007-194370 A | 8/2007 |
| JP | 2009-176889 A | 8/2009 |
| JP | 2010-254935 A | 11/2010 |

OTHER PUBLICATIONS

Itayama, Hidekatsu, et al.; "Properties of Insulating Film and Sheet Materials for Class F Insulation"; Hitachi Review; 1972; pp. 461-467; vol. 21; Issue No. 11; Japan.

Nakano, Mineo, et al.; "Characteristics of Polyamideimide Film"; 1971; Hitachi Review; pp. 503-509; vol. 20; Issue No. 12; Japan.

Bolton, B.A.; "Al Polymer Laminates for High Temperature Stability"; Polymer Engineering and Science; Jul. 1966; pp. 227-230.

"Thermoplastic Polyimides"; Nov. 2002; pp. 141-147; Specialty Chemicals; SRI International.

International Search Report, PCT/US2012/037558, dated Nov. 7, 2012.

Written Opinion, PCT/US2012/037558, dated Nov. 7, 2012.

International Search Report, PCT/US2013/070324, dated Mar. 6, 2014.

International Written Opinion , PCT/US2013/070324, dated Mar. 6, 2014.

Search Report of Taiwanese patent application, dated Nov. 13, 2015.

Non Final Office Action for U.S. Appl. No. 13/678,470, dated Dec. 17, 2015.

Office Action in Chinese Application CN 201280022867.6, dated Jul. 8, 2015.

Office Action in Chinese Application CN 201280022867.6, dated Nov. 15, 2014.

Office Action in Chinese Application CN 201280022867.6, dated May 23, 2016.

Office Action in Chinese Application CN 201280022867.6, dated Dec. 29, 2015.

Office Action in Japanese Application JP 2014-510499, dated Apr. 25, 2016.

Office Action in Japanese Application JP 2014-510499, dated Nov. 28, 2016.

Office Action in European Application EP 12781654, dated Apr. 21, 2015.

Office Action in European Application EP 12781654, dated Jul. 7, 2016.

Taiwanese Office Action in Application No. 102141716, dated Mar. 24, 2017.

Critchley, et al., "Polymers with Heterocyclic Rings in the Chain," Heat-Resistant Polymers, 1983, p. 239-248.

* cited by examiner

COMPOSITE INSULATING FILM

CROSS REFERENCE TO RELATED APPLICATIONS

This application claims the benefit of the filing date under 35 U.S.C. 119(e) of U.S. Provisional Application For Patent Ser. No. 61/485,180 filed on May 12, 2011, which is hereby incorporated by reference in its entirety.

TECHNICAL FIELD

Disclosed is a composite insulating film for use in electrical insulation applications. The composite insulating films includes a layer of partially cured poly(amide)imide that has been a applied to a base polymer layer.

BACKGROUND

Resinous coating compositions based on poly(amide) imide form flexible and durable films and are particularly useful as wire enamels, varnishes, adhesives for laminates, paints and the like. Such poly(amide)imide base coating compositions are particularly noted for their long term high temperature capability of the order of 220° C., which, in addition to their other qualities, makes them particularly useful in electrical insulating applications such as for magnet wire enamels. This is as compared to the usual polyester and polyesterimide base coating compositions which do not have such highly continuous heat resistance.

Poly(amide)imides are generally prepared using relatively expensive organic solvents, the economic use of amideimide coatings has been inhibited. Therefore, it has been customary to use such poly(amide)imide compositions as overcoats over less expensive polyester or polyesterimide base coats.

Polyethylene terephthalate (PET) films are widely used as electrical insulating films in view of their mechanical and electrical properties, and relatively low production costs. However, PET films possess low thermal resistance and therefore are ranked as Class B insulation or lower. Polyaramid films, such as those commercially available from Du Pont under the trademark NOMEX, exhibit superior thermal resistance as compared to PET films but have reported dielectric breakdown problems.

Poly(amide)imide films exhibit mechanical properties, thermal properties, abrasion resistance, and chemical resistance that make them suitable as electrical insulation materials. While poly(amide)imide films exhibit a number of superior physical properties as compared to polyaramid and polyester films, cost and free standing film property considerations have hindered commercialization of poly(amide) imide films for electrical insulation applications.

What is therefore needed in the art is a cost-effective electrical insulation material that exhibits a suitable combination of mechanical properties, thermal properties, abrasion resistance, and chemical resistance.

SUMMARY

The present summary section is intended to provide a summary of the disclosure in order to provide a basic understanding of the composite insulating film and methods of preparation and use to the reader. This summary section is not intended to constitute an extensive overview of the disclosure of the composite film and methods of preparation and use and it does not identify key/critical elements of the composite film or methods nor does it delineate the scope of the disclosure. The sole purpose of the present summary section is to present some concepts disclosed herein in a simplified form as an introduction to the more detailed description that is presented below.

Provided is a flexible and self-supporting composite film comprising a base polymer film layer; and a partially cured poly(amide)imide film layer.

Also provided is a process for preparing a flexible and self-supporting composite film comprising providing a base polymer film layer, casting a poly(amide)imide film layer on said base polymer film layer, and partially curing said poly(amide)imide film layer.

Additionally provided is a method of providing insulation to an electric motor or transformer comprising providing a flexible and self-supporting composite film comprising a base polymer film layer and a partially cured poly(amide) imide film layer on said base film layer and inserting said composite film into an electric motor slot or transformer.

Further provided is an electric motor or transformer comprising a component to be insulated and a flexible and self-supporting composite film comprising a base polymer film layer and a partially cured poly(amide)imide film layer on said base film layer adjacent said component.

Further provided is a method of providing insulation to an electric motor comprising providing an electric motor component having a slot therein and inserting a flexible and self-supporting composite film comprising a base polymer film layer and a partially cured poly(amide)imide film layer on said base film layer into said slot.

DETAILED DESCRIPTION

Figure 1:
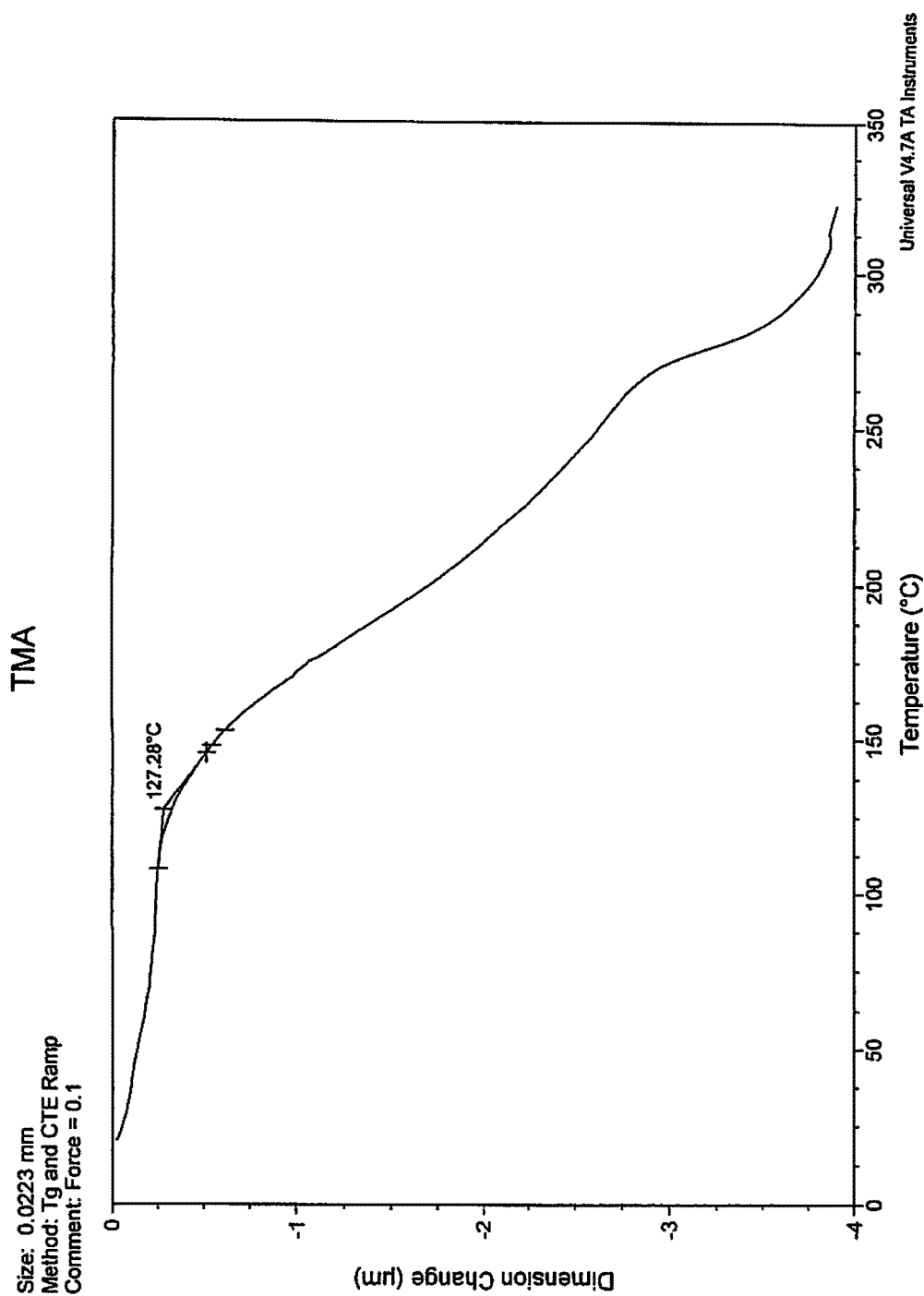
FIG. 1 is a graph depicting a thermomechanical analysis (TMA) of an uncured cast high molecular weight poly (amide)imide film.

Disclosed is a flexible and self-supporting composite insulating film. The composite insulating film includes base polymer film layer and a partially cured poly(amide)imide film layer in adjacent contact with a surface of the base polymer film layer. According to certain illustrative embodiments of the composite insulating film, the partially cured poly(amide)imide film layer is cast onto a surface of the base polymer film layer.

Without limitation, and only by way of illustration, the base polymer film layer of the composite insulating film may be selected from a polyamide film, a polyimide film, a polyester film such as polyesterterephthalate (PET) or polyesternaphthenate (PEN), a polyethersulfone film, a polysulfone film, or a polyetherimide film. According to certain illustrative embodiments, the base polymer film layer of the composite insulating film comprises a polyester film. According to this embodiment, the composite insulating film comprises a base polymer film layer of a polyester having a poly(amide)imide film layer applied or otherwise deposited onto at least a portion of the base polyester film layer.

The composite insulating film comprising a base polymer film layer of a polyester and having a poly(amide)imide film layer applied thereon may have a thickness from about 2 mils to about 20 mils. According to certain illustrative embodiments, the composite insulating film may have an overall thickness from about 2.5 mils to about 16 mils. The partially cured poly(amide)imide layer of the composite insulating film may have a thickness from about 0.1 to about 5 mils. According to certain illustrative embodiments, the poly(amide)imide layer of the composite insulating film may have a thickness from about 0.5 to about 2 mils. The poly(amide)imide layer may be applied to one or both of the opposite facing surfaces of the polyester layer. The thin nature of the composite film exhibits flexibility, sufficient structural integrity to be inserted into electric motor slot, and exhibits thermal index up to about 220° C.

The flexible and self-supporting composite insulating film may be prepared by a process that includes providing a base polymer film layer and applying a poly(amide)imide layer onto a surface of the base polymer film layer. The composite film may be prepared by first providing the base polymer film layer and casting a poly(amide)imide film layer onto a surface of the base polymer film layer. According to certain illustrative embodiments, the poly(amide)imide film layer is cast onto one major surface of the base polymer layer. However, according to other illustrative embodiments, the poly(amide)imide layer may be cast onto both of the opposite facing major surfaces of the base polymer layer. The poly(amide)imide layer or layers are then partially cured. This provides a flexible and self-supporting composite film having a structural integrity making the film suitable for insertion into a slot in an electric motor.

The process for preparing the composite insulating film includes providing a base polymer film layer that is selected from a polyamide film, a polyimide film, a polyester film, a polyethersulfone film, a polysulfone film, or a polyetherimide film. The process includes selecting or preparing a base polymer film layer of a polyester film having a thickness from about 2 mils to about 14 mils. A poly(amide)imide film layer is applied to a surface of the base polyester film layer. By way of example, the poly(amide)imide film layer is cast onto the surface of the base polyester film layer. The poly(amide)imide maybe cast on the base polyester layer to achieve a thickness from about 0.5 mil to about 2 mil. The poly(amide)imide layer may be cast onto one or both of the opposite facing surfaces of the polyester base layer.

Once the poly(amide)imide film layer is cast onto the surface of the base polyester layer, then the poly(amide)imide layer is partially cured to obtain a composite insulating film that is flexible and self-supporting. The poly(amide)imide film layer may be partially cured by heating the layer at a temperature of about 100° C. to about 260° C. for about 20 seconds to about 60 minutes. Alternatively, the poly(amide)imide film layer may be partially cured by heating the layer at a temperature of about 150° C. to about 180° C. for about 1 minute to about 10 minutes.

There is no limitation to the poly(amide)imide as a basic resin that may be used to prepare the composite insulating film. There can be used a polyamideimide, for example, obtained by direct reaction of a tricarboxylic acid anhydride and diisocyanates in a polar solvent or obtained by reacting a tricarboxylic acid anhydride with diamines in a polar solvent to introduce imide bonds and then carrying out amidation with diisocyanates, in a usual manner. A further illustrative method is the reaction tricarboxylic anhydride acid chloride with diamines in a polar solvent.

As the tricarboxylic acid anhydride that can be used for preparing this basic resin for the film forming layer, a trimellitic acid anhydride is generally used. A variety of carboxylic anhydrides are used in making poly(amide)imides. These include, but are not limited to: trimellitic anhydride (TMA); 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone 3,3',4-tricarboxylic anhydride; diphenyl isopropylidene 3,3',4-tricarboxylic anhydride; 3,4,10-perylene tricarboxylic anhydride; 3,4-dicarboxyphenyl 3-carboxyphenyl ether anhydride; ethylene tricarboxylic an hydride; 1,2,5-naphthalene tricarboxylic anhydride.

A part of the amount of the tricarboxylic acid anhydride may be replaced by a tetracarboxylic acid anhydride when it is reacted. As the tetracarboxylic acid anhydride in this case, use can be made, for example, of pyromellitic acid dianhydride, 3,3',4,4'-benzophenonetetracarboxylic acid dianhydride, or the like. Further, a part of the amount of the tricarboxylic acid anhydride may be replaced by another acid or acid anhydride, for example, trimellitic acid, isophthalic acid, adipic, maleic, or terephthalic acid.

Non-limiting examples of the diisocyanates that can be reacted with the tricarboxylic acid anhydride, include aromatic diisocyanates such as 4,4-diphenylmethane diisocyanate and tolylene diisocyanate, and examples of the diamine include aromatic diamines such as m-phenylenediamine, 4,4'-diaminodiphenyl ether, 1,2-ethylenediamine, 4,4'-diaminodiphenylmethane, 4,4'-diaminodiphenylsulfon and 4,4'-diaminobenzophenone.

According to certain embodiments, the poly(amide)imide resin may be used in combination with one or more other compatible resins to prepare the composite insulating film. For example, and not in limitation, the poly(amide)imide resin may be used in combination with one or more of the following compatible resins to prepare the composite insulating film: polyimides, polyetherimide, polysulfone, polyethersulfone, polyvinyl alcohol, polyvinylbutyral, polyetherketone, phenoxy resins, and combinations thereof.

The additional compatible resins may be used in combination with the poly(amide)imide resin to improve a variety of different performance properties of the composite insulation film. For example, the one or more additional resin may be used in combination with the poly(amide)imide resin to improve the adhesion, thermal endurance, and/or flexibility of the resulting composite insulating film. According to certain illustrative embodiments, the poly(amide)imide film may be used in combination with polyethersulfone to improve the adhesion of the resulting composite insulating film to aluminum. For example, and without limitation, the polyethersulfone maybe blended with the poly(amide)imide in an amount from about 1 weight percent to about 99 weight percent.

The present disclosure also includes a method of providing insulation to an electric motor or transformer. The method of providing insulation to an electric motor or transformer includes providing a flexible and self-supporting composite film comprising a base polymer film layer and a partially cured poly(amide)imide film layer onto the base film layer and inserting the composite film into an electric motor slot or transformer.

The following non-limiting amines can be useful either alone or in mixtures: p-xylene diamine, bis(4-amino-cyclohexyl)methane, hexamethylene diamine, heptamethylene diamine, octamethylene diamine, nonamethylene diamine, decamethylene diamine, 3-methyl-heptamethylene diamine, 4,4'-dimethylheptamethylene diamine, 2,11-diamino-dodecane, 1,2-bis-(3-amino-propoxy)ethane, 2,2-dimethyl propylene diamine, 3-methoxy-hexamethylene diamine, 2,5-dimethylhexamethylene diamine, 2,5-dimethylheptamethylene diamine, 5-methylnonamethylene diamine, 1,4-diamino-cyclo-hexane, 1,12-diamino-octadecane, 2,5-diamino-1,3,4-oxadiazole, $H_2N(CH_2)_3O(CH_2)_2O(CH_2)_3NH_2$, $H_2N(CH_2)_3S(CH_2)_3NH_2$, $H_2N(CH_2)_3N(CH_3)(CH_2)_3NH_2$ meta-phenylene diamine, para-phenylene diamine, 4,4'-diamino-diphenyl propane, 4,4'-diamino-diphenyl methane benzidine, 4,4'-diamino-diphenyl sulfide, 4,4'-diamino-diphenyl sulfone, 3,3'-diamino-diphenyl sulfone, 4,4'-diamino-diphenyl ether, 2,6-diamino-pyridine, bis(4-amino-phenyl)diethyl silane, bis(4-amino-phenyl)diphenyl silane, [bis(4-amino-phenyl)phosphine oxide, 4,4'-diaminobenzophenone, bis(4-amino-phenyl)-N-methylamine, bis(4-aminobutyl)tetramethyldisiloxane, 1,5-diaminonaphthalene, 3,3'-dimethyl-4,4'-diamino-biphenyl, 3,3'-dimethoxy benzidine, 2,4-bis(beta-amino-t-butyl)toluene toluene diamine, bis(para-beta-amino-t-butyl-phenyl) ether, para-bis(2-methyl-4-amino-pentyl)benzene, para-bis(11,1-dimethyl-5-amino-pentyl)benzene, m-xylylene diamine, and polymethylene polyaniline.

Any polyisocyanate, that is, any isocyanate having two or more isocyanate groups, whether blocked or unblocked, can be used in making polyamideimides. Polyisocyanates which are useful alone, or in admixture, include: tetramethylenediisocyanate, hexamethylenediisocyanate, 1,4-phenylenediisocyanate, 1,3-phenylenediisocyanate, 1,4-cyclohexylenediisocyanate, 2,4-tolylenediisocyanate, 2,5-tolylenediisocyanate, 2,6-tolylenediisocyanate, 3,5-tolylenediisocyanate 4-chloro-1,3-phenylenediisocyanate, 1-methoxy-2,4-phenylenediisocyanate, 1-methyl-3,5-diethyl-2,6-phenylenediisocyanate, 1,3,5-triethyl-2,4-phenylenediisocyanate, 1-methyl-3,5-diethyl-2,4-phenylenediisocyanate, 1-methyl-3,5-diethyl-6-chloro-2,4-phenylenediisocyanate, 6-methyl-2,4-diethyl-5-nitro-1,3-phenylenediisocyanate, p-xylylenediisocyanate, m-xylylenediisocyanate, 4,6-dimethyl-1,3-xylylenediisocyanate, 1,3-dimethyl-4,6-bis-(b-isocyanatoethyl)-benzene, 3-(a-isocyanatoethyl)-phenylisocyanate, 1-methyl-2,4-cyclohexylenediisocyanate, 4,4'-biphenylenediisocyanate, 3,3'-dimethyl-4,4'-biphenylenediisocyanate, 3,3'-dimethoxy-4,4'-biphenylenediisocyanate, 3,3'-diethoxy-4,4-biphenylenediisocyanate, 1,1-bis-(4-isocyanatophenyl)cyclohexane, 4,4'-diisocyanato-diphenylether, 4,4'-diisocyanato-dicyclohexylmethane, 4,4'-diisocyanato-diphenylmethane, 4,4'-diisocyanato-3,3'-dimethyldiphenylmethane, 4,4'-diisocyanato-3,3'-dichlorodiphenylmethane, 4,4'-diisocyanato-diphenyldimethylmethane, 1,5-naphthylenediisocyanate, 1,4-naphthylenediisocyanate, 4,4',4''-triisocyanato-triphenylmethane, 2,4,4'-triisocyanato-diphenylether, 2,4,6-triisocyanato-1-methyl-3,5-diethylbenzene, o-tolidine-4,4'-diisocyanate, m-tolidine-4,4'-diisocyanate, benzophenone-4,4'-diisocyanate, biuret triisocyanates, and polymethylenepolyphenylene isocyanate.

Further disclosed is an electric motor or transformer comprising a component to be insulated; and a flexible and self-supporting composite film comprising a base polymer film layer and a partially cured poly(amide)imide film layer on the base film layer that is positioned adjacent to the component being insulated. The composite insulating film may be used in a typical 3-phase stator with slot liners. The stator is positioned within a housing and having a rotor in the center. The metal material on the stator comprises the core. Suitably shaped slot liners (such as, for example, shaped like a C) are inserted in the slots. The copper coils are then inserted in the slots, using the composite insulating film liner as an insulation barrier between the core and the copper windings. A second piece of material is inserted that is the inverse of the slot liner (also C shape), which is referred to in the art as "wedge," to maintain the copper in slot so that it doesn't move around.

The composite electrical insulating film has been tested for fabrication properties. The material exhibited superior performance in the ability to be slit, die cute, sheeted and otherwise processed. Drag knife cutting of small parts was also capable of being carried out with issue. Laser cutting of the material was also performed without issue or char that is typically associated with NOMEX based materials. Formation of wedges in an automated process was also examined, and the composite film performed very well with cuffing and insertion in an automated line without scratching or delamination. Wire insertion in the motor slots exhibited minimal resistance as compared to other known materials.

Further disclosed is a method of providing insulation to an electric motor comprising providing an electric motor component having a slot therein. A flexible and self-supporting composite film comprising a base polymer film layer and a partially cured poly(amide)imide film layer on the base film layer is inserted into the slot.

The following examples are set forth to describe the composite insulating films and methods in further detail and to illustrate. The examples following should not be construed as limiting the composite insulating films or method of preparation in any manner.

EXAMPLES

Example 1

Synthesis of High Molecular Weight Poly(Amide)Imide

In a 3 L flask equipped with thermocouple, water condenser, nitrogen inlet and air driven blade stirrer, 916.7 g of N-methyl-2-pyrrolidone (NMP) was added under agitation (nitrogen flow 0.5 L/min). Trimellitic anhydride (107.2 g, 0.558 moles) and diphenylmethane-4,4' diisocyanate (153.5 g, 0.614 moles) were added under agitation. The reaction mixture was heated to 93° C. and held at that temperature for about one hour, and then heated to 120° C. and held for about one hour. The reaction mixture was then heated to 138-150° C. and viscosity was monitored by G-H tube (pulled 15 g sample from flask and diluted to 20 g in NMP for viscosity measurement). When the viscosity reached to Z, heating was stopped and 300 g of NMP was added. On cooling at 100° C., 4.4 g of n-butanol and 90.7 g NMP were added. An analysis of the reaction product revealed 15.9% solids (after 2 hours at 200° C.) and a viscosity of 2751 cps at 25° C.

Example 2

Synthesis of Intermediate Molecular Weight Poly(Amide)Imide

In a 3 L flask equipped with thermocouple, water condenser, nitrogen inlet and air driven blade stirrer, 916.7 g of N-methyl-2-pyrrolidone (NMP) was added under agitation (nitrogen flow 0.5 L/min). Trimellitic anhydride (107.2 g, 0.558 moles) and diphenylmethane-4,4' diisocyanate (153.5 g, 0.614 moles) were added under agitation. The reaction mixture was heated to 93° C. and held for one hour, and then heated to 120° C. and held for 1 hour. The reaction mixture was then heated to 138-150° C. and viscosity was monitored by G-H tube (pulled 15 g sample from flask and diluted to 20 g in NMP for viscosity measurement). When the viscosity reached to S, heating was stopped and 300 g of NMP was added. On cooling at 100° C., 4.4 g of n-butanol and 90.7 g NMP were added. An analysis of the reaction product revealed 15.4% solids (after 2 hours at 200° C.) and a viscosity of 506 cps at 25° C.

Example 3

Synthesis of Low Molecular Weight Poly(Amide)Imide

In a 3 L flask equipped with thermocouple, water condenser, nitrogen inlet and air driven blade stirrer, 500.1 g of N-methyl-2-pyrrolidone (NMP) was added under agitation (nitrogen flow 0.5 L/min). Trimellitic anhydride (124.2 g, 0.646 moles) and diphenylmethane-4,4' diisocyanate (161.6 g, 0.646 moles) were added under agitation. The reaction mixture was heated to 93° C. and held for one hour, and then heated to 120° C. and held for 1 hour. Viscosity was monitored by G-H tube (pulled 45 g sample from flask and diluted to 66 g in NMP for viscosity measurement). When the viscosity reached to Z, heating was stopped and 125 g of NMP was added. On cooling at 100° C., 2.3 g of methanol and 165 g NMP were added. An analysis of the reaction product revealed 25.4% solids (after 2 hours at 200° C.) and a viscosity of 2402 cps at 25° C.

The resin solutions were cast onto a glass support and partially cured at 150° C. for 60 minutes followed by a full-cure at 260° C. for 20 minutes. The properties of the cured low, intermediate, and high molecular weight poly (amide)imide films are set forth below in Tables 1A and 1B.

Cured Film Properties

TABLE 1A

| Example | Mn | Tensile strength PSI | Tensile Modulus PSI |
|---|---|---|---|
| 1 | 7000 | brittle | brittle |
| 2 | 14000 | 14000 | 440000 |
| 3 | 36000 | 16000 | 330000 |

TABLE 1B

| Sample | Tg (° C.) | Elmendorf Tear Strength (gm/mil) | Graves Tear Strength (lbf/mil) |
|---|---|---|---|
| 1 | 270 | brittle | brittle |
| 2 | 270 | 5.7 | 1.4 |
| 3 | 250 | 8 | 1.8 |

The cured film properties of tensile strength and tensile modulus reported in Table 1A were obtained in accordance with -ASTM D-882-91 Method A.

The Elmendorf Tear strength was obtained in accordance with ASTM D-1922-89.

The Graves Tear Strength was obtained in accordance with ASTM-D-1004-90.

Uncured Film Properties

The poly(amide)imide resin solutions were cast onto front and back side of a base PET polyester film (100 microns) using a slot coating method. The composite film was then dried in an oven at 175° C. for roughly 2 minutes to remove all solvent leaving 12.5 microns of a partially cured PAI layer on both the front and back sides of the PET film. The mechanical properties (elongation, tensile modulus, tensile strength) and tear strength of composite insulating films comprising a layer of polyester film and including layers of uncured poly(amide)imide are set forth in Tables 2A and 2B below.

Figure 3:
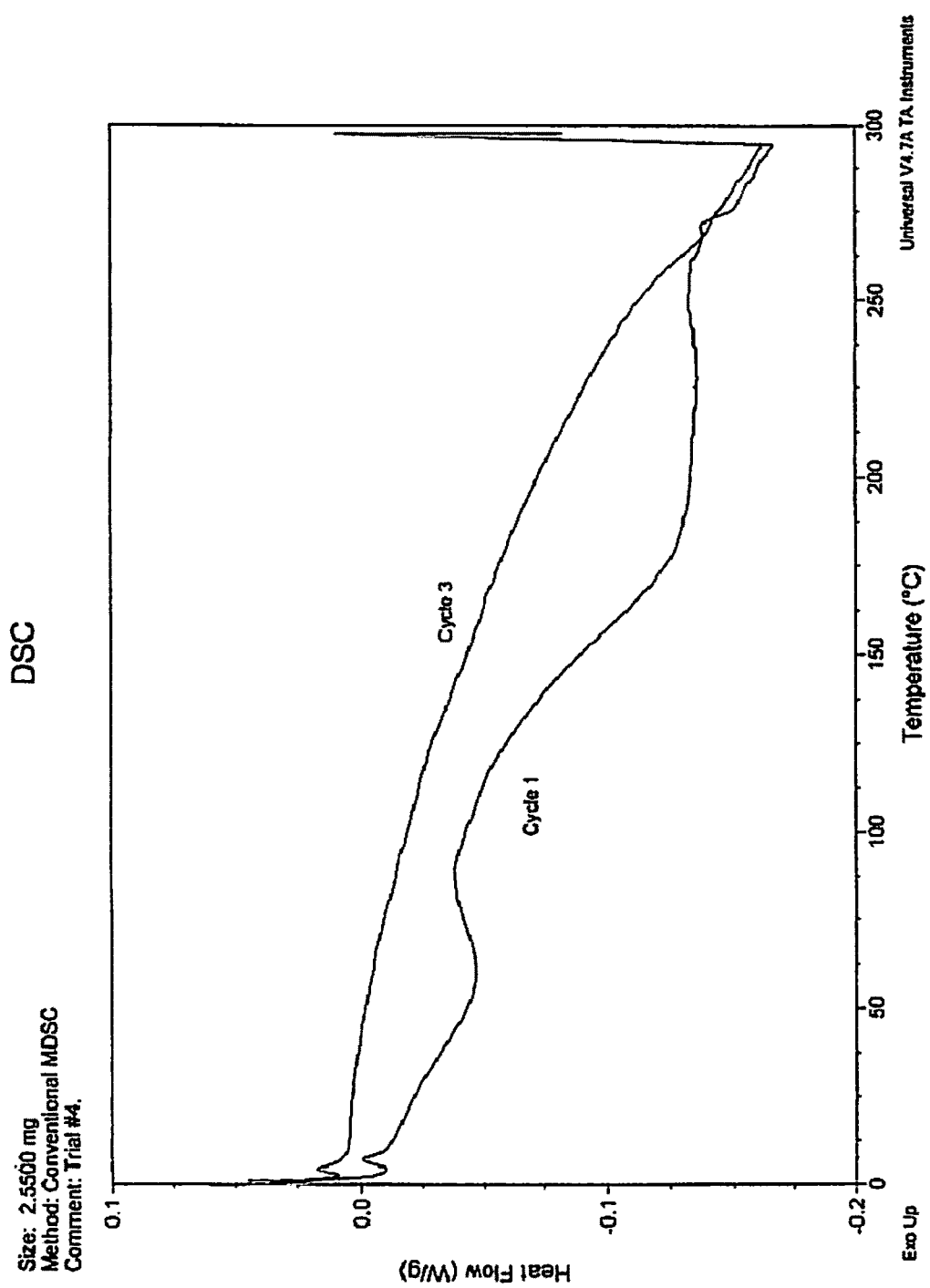
FIG. 3 is a graph depicting a modulated differential scanning calorimetry analysis (mDSC) on uncured high molecular weight poly(amide)imide film.
Figure 4:
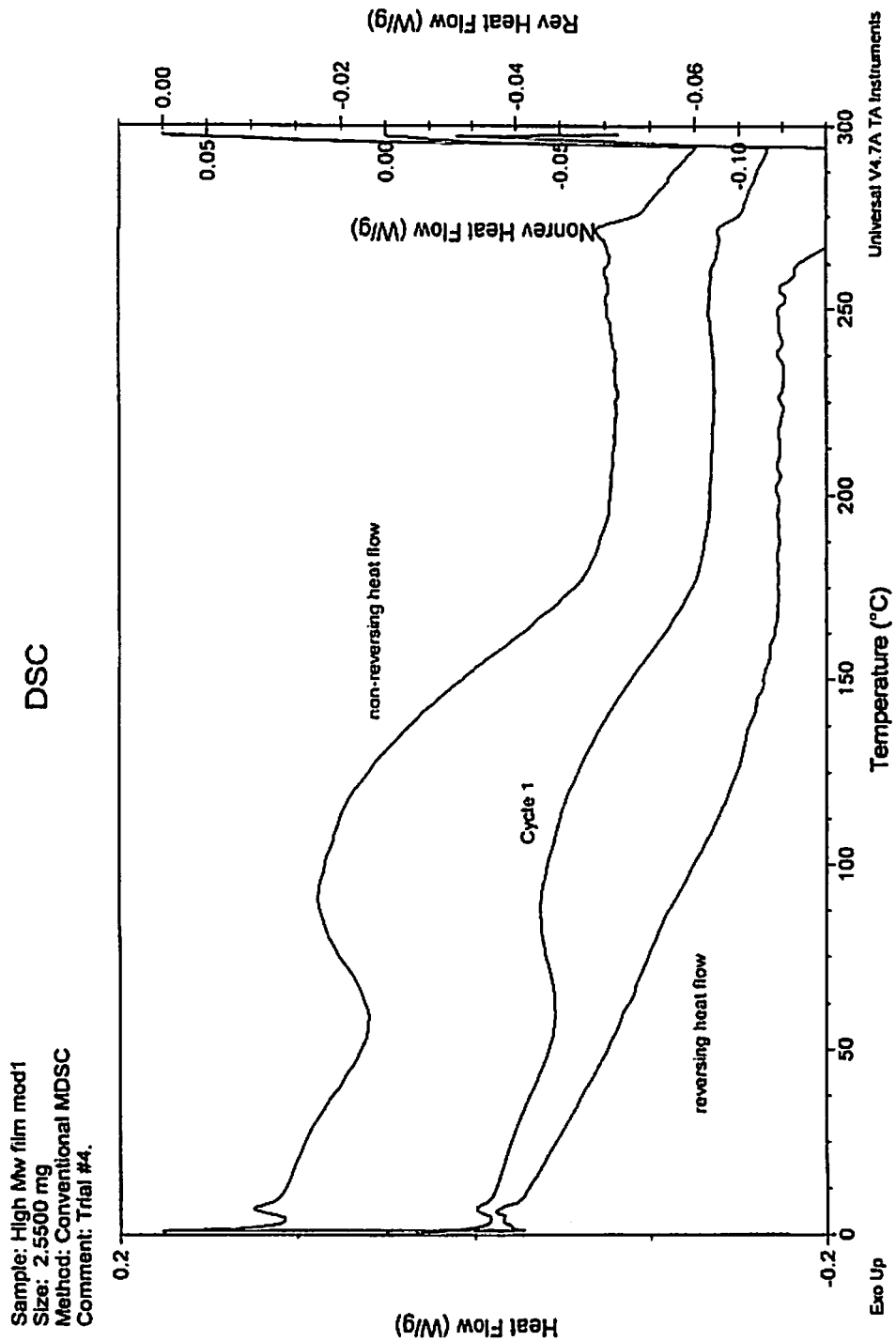
FIG. 4 is a graph depicting a differential scanning calorimetry analysis (mDSC) showing the reversing and non-reversing heat flow components on first heating cycle of a high molecular weight poly(amide)imide film.
Figure 5:
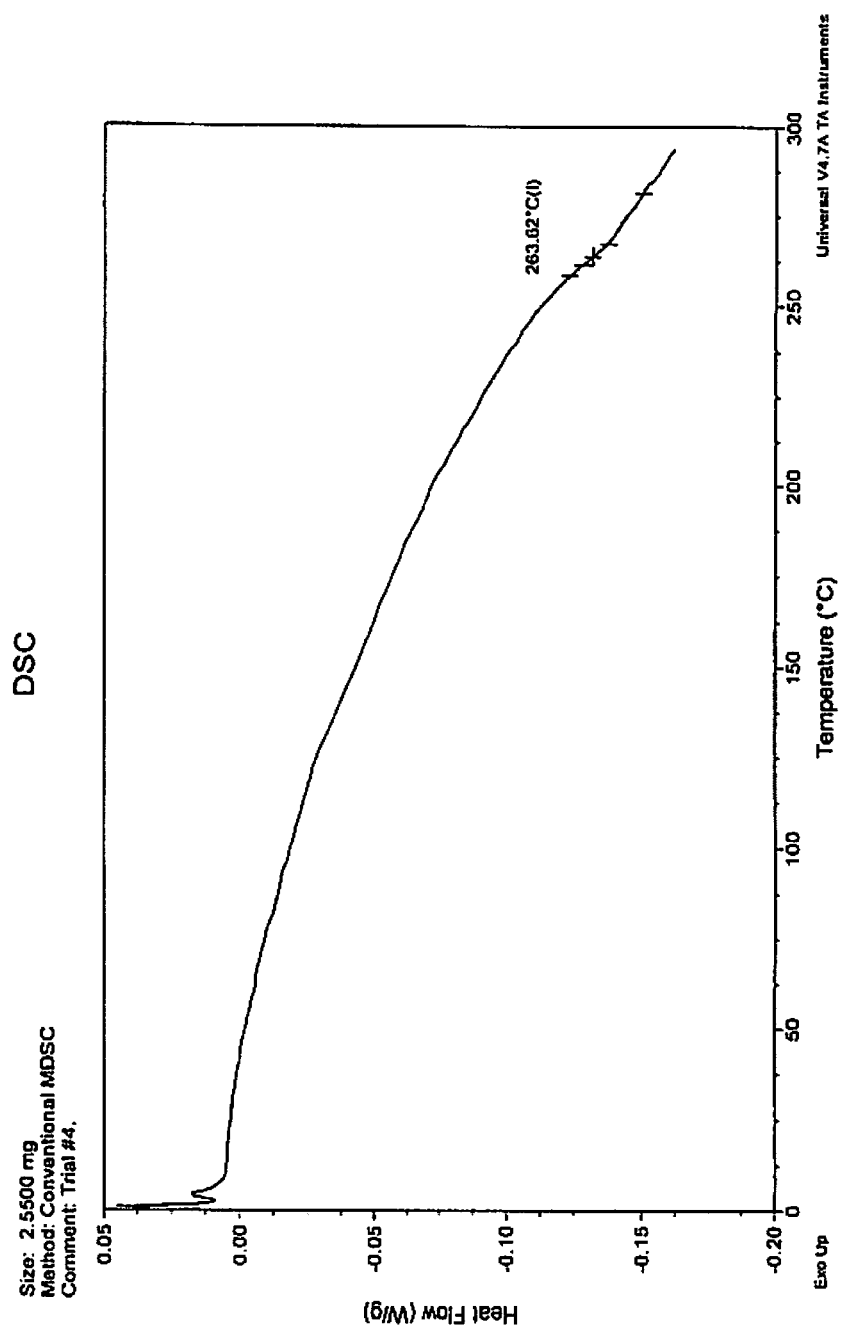
FIG. 5 is a graph depicting a differential scanning calorimetry analysis (mDSC) showing the reversing heat flow component showing for a second heating cycle of cured high molecular weight poly(amide)imide film.
Figure 6:
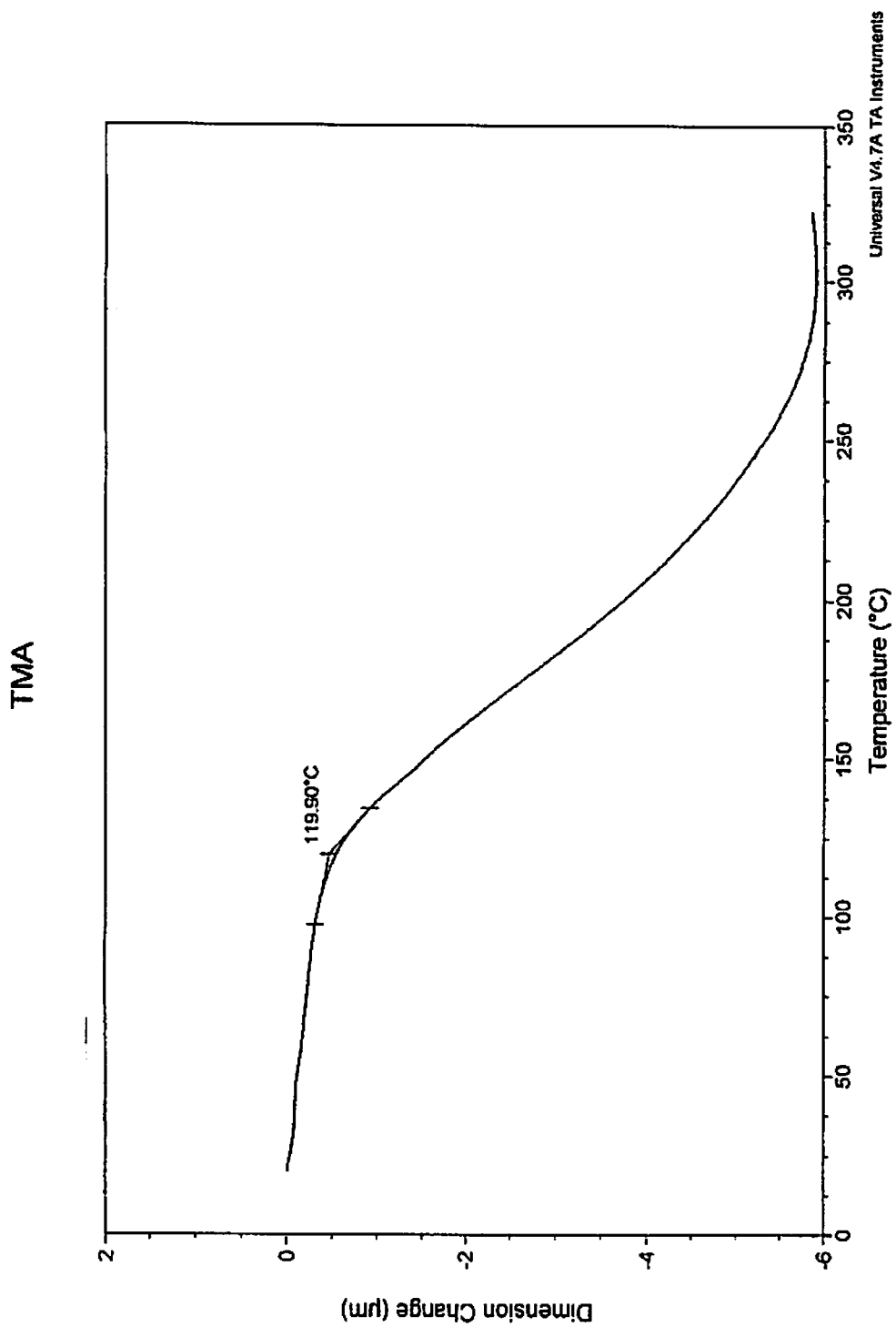
FIG. 6 is a graph depicting a is a graph depicting a thermomechanical analysis (TMA) of an uncured cast low molecular weight poly(amide)imide film.
Figure 7:
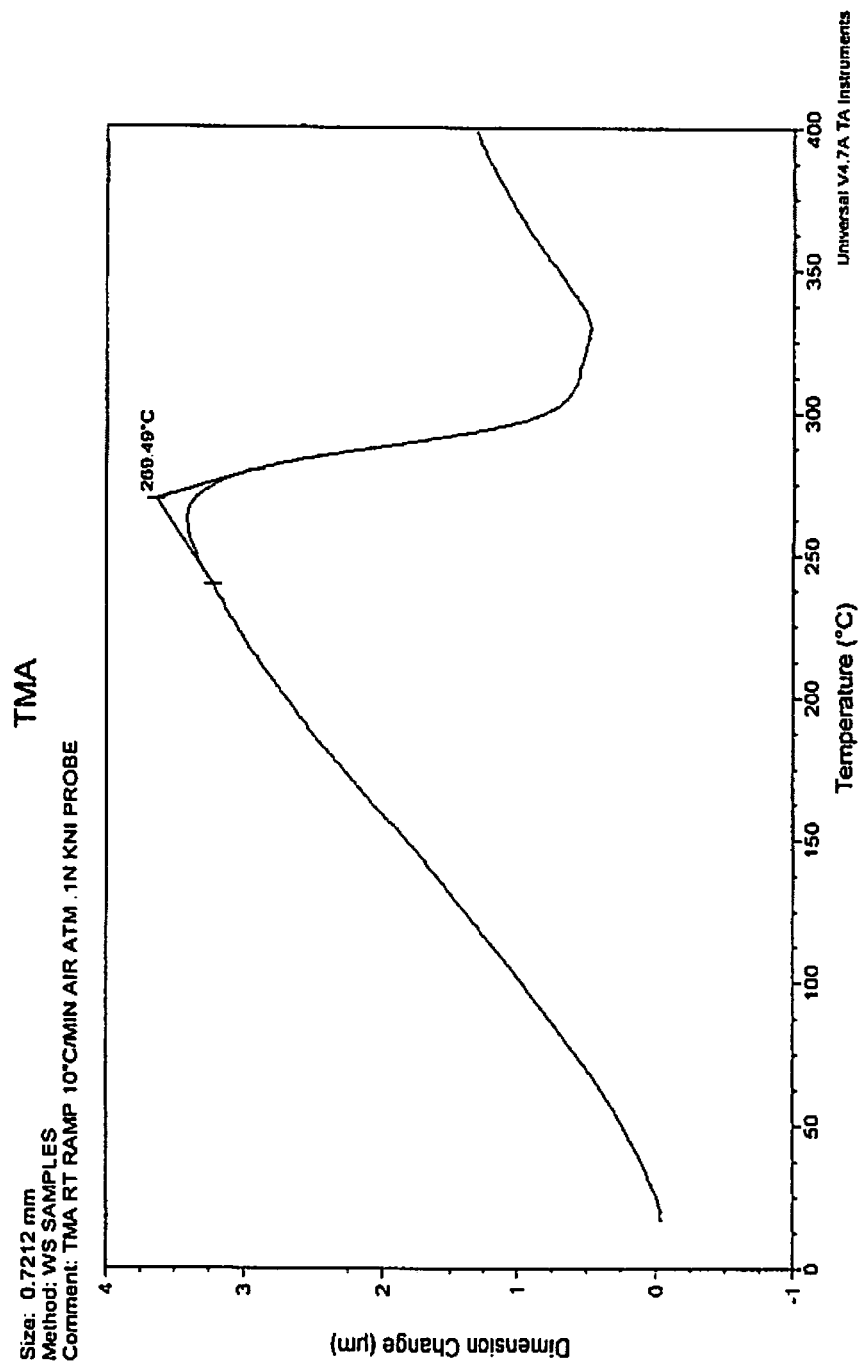
FIG. 7 is a graph depicting a thermomechanical analysis (TMA) of an fully cured cast low molecular weight poly (amide)imide film.
Figure 8:
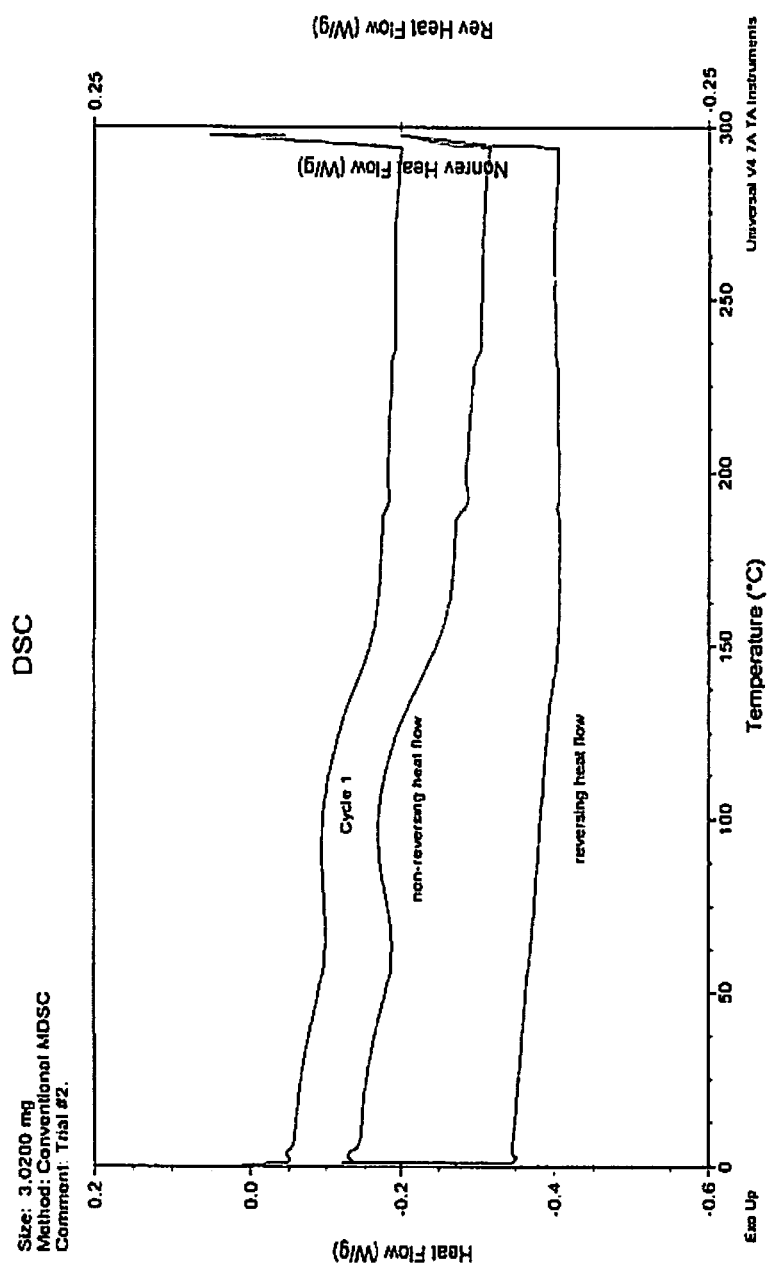
FIG. 8 is a graph depicting a modulated differential scanning calorimetry analysis (mDSC) showing the reversing and non-reversing heat flow components on first heating cycle of a low molecular weight poly(amide)imide film.
Figure 9:
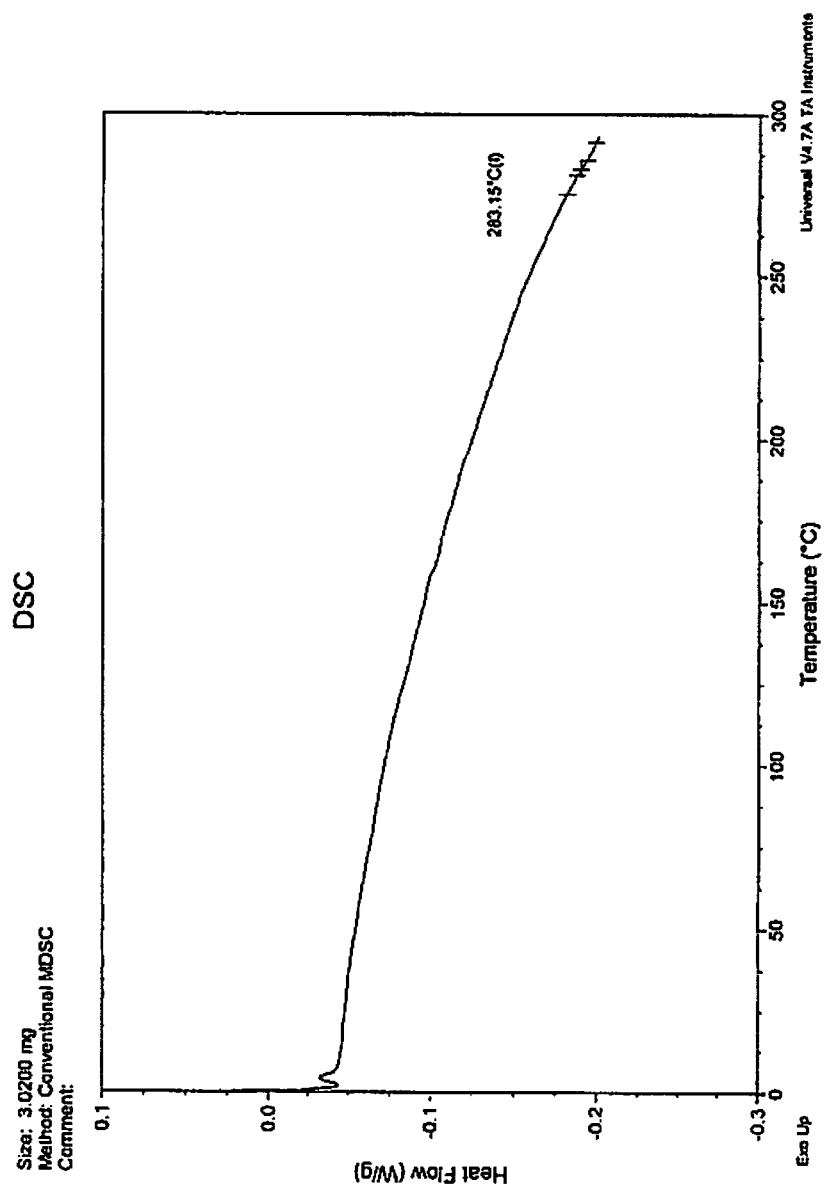
FIG. 9 is a graph depicting a differential scanning calorimetry analysis (mDSC) showing the reversing heat flow component showing for a second heating cycle of cured low molecular weight poly(amide)imide film.

The poly(amide)imide layer can be removed from the PET base and examined for cure state by modulated differential scanning calorimetry (FIG. 3). A broad exotherm is seen between 50-200° C. that is non-reverseable heat flow event (FIG. 4). This suggests a curing event is possibly taking place under these conditions. A second heating shows glass transition of roughly 270° C. showing the fully cured film properties (FIG. 5).

Figure 2:
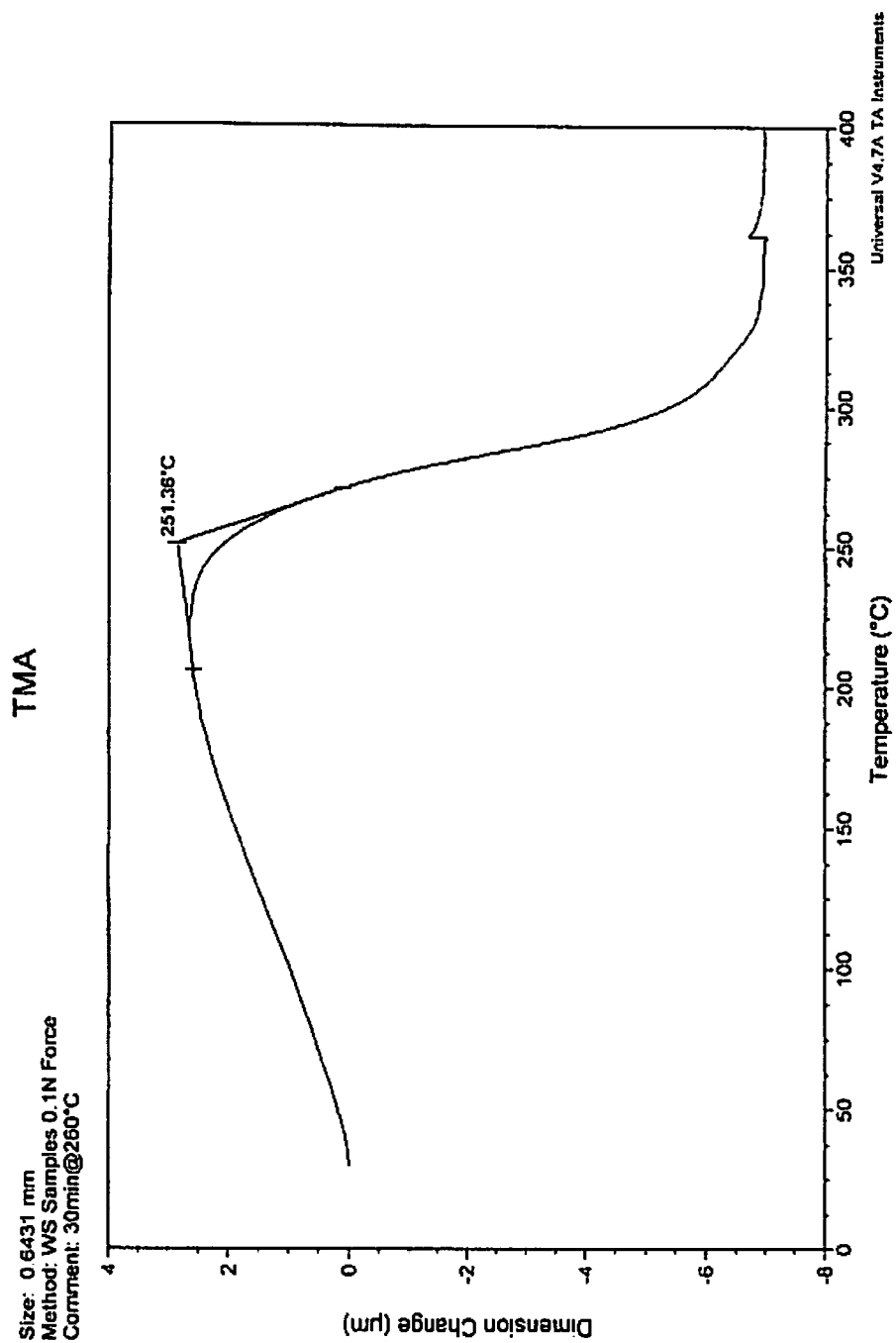
FIG. 2 is a graph depicting a thermomechanical analysis (TMA) of an fully cured cast high molecular weight poly (amide)imide film.

The partially cured film is also confirmed by thermomechanical analysis (TMA). The TMA of partially cured poly (amide)imide film shows a potential glass transition at 115-127° C. (FIG. 1). A fully cured film (260° C. for 30 minutes) shows a glass transition at roughly 250-270° C. by this method (FIG. 2). FIGS. 6-9 depict the same thermal analysis of the low Mw PAI film that was cast on a PET base polymer.

TABLE 2A

Tear Strength

| Sample | Tear Strength (lb/in) |
|---|---|
| High Mw PAI/PET/High Mw PAI, 125 microns | 1510 |
| Low Mw PAI/PET/Low Mw PAI 125 microns | 1779 |
| NMN, 125 microns | 1886 |
| Mylar, 87.5 microns | 2718 |

TABLE 2B

Tensile Properties

| Sample | Elongation | Tensile strength PSI | Tensile Modulus PSI |
|---|---|---|---|
| High Mw PAI/PET/High Mw PAI, 125 microns | 28.64% | 10710 | 49477 |
| Low Mw PAI/PET/Low Mw PAI 125 microns | 61.52% | 14256 | 24099 |
| NMN, 125 microns | 18.16% | 12640 | 69878 |
| Mylar, 87.5 microns | 21.36% | 19734 | 92598 |

The Tear strength properties reported in Table 2A were obtained in accordance with ASTM D624.

The Tensile properties of tensile strength and tensile modulus were obtained in accordance with ASTM D638.

The volume resistivity of composite insulating films comprising a layer of PET film and including layers of partially cured poly(amide)imide is set forth in Table 3 below.

TABLE 3

| Sample | Volume Resistivity Ohm-cm |
| --- | --- |
| High Mw PAI/Mylar/High Mw PAI, 125 microns | $1.16 \times 10^{16}$ |
| Low Mw PAI/Mylar/Low Mw PAI 125 microns | $1.59 \times 10^{16}$ |
| NMN, 125 microns | $2.23 \times 10^{16}$ |
| Mylar, 87.5 microns | $9.16 \times 10^{15}$ |

The volume resistivity values were obtained in accordance with ASTM D257.

The dielectric breakdown of composite insulating films comprising a layer of polyester film and including layers of partially cured poly(amide)imide is set forth in Table 4 below.

TABLE 4

| Sample | Dielectric breakdown KV/MIL |
| --- | --- |
| High Mw PAI/Mylar/High Mw PAI, 125 microns | 2.48 |
| Low Mw PAI/Mylar/Low Mw PAI 125 microns | 2.76 |
| NMN, 125 microns | 1.81 |
| Mylar, 87.5 microns | 4.58 |

The Dielectric break down values were obtained in accordance with ASTM D-115.

The composite insulting films comprising a layer of polyester film and including layers of uncured poly(amide)imide were subjected to chemical resistance testing. The results of the chemical resistance testing is set forth in Table 5 below. Material was submerged in each of the solvents/solutions below for one day. Material was then observed for physical changes.

TABLE 5

| Solvent | High Mw PAI/Mylar/High Mw PAI, 125 microns | Low Mw PAI/Mylar/Low Mw PAI 125 microns | NMN, 125 microns | Mylar, 87.5 microns |
| --- | --- | --- | --- | --- |
| | | 1 day | | |
| Acetone | No change | No change | No change | No change |
| Ethanol | No change | No change | No change | No change |
| Toluene | No change | No change | No change | No change |
| 20% HCl | No change | No change | No change | No change |
| 50% Acetic acid | No change | No change | No change | No change |
| 25% Sulfuric acid | No change | No change | No change | No change |

While the composite insulating film and methods of preparation and use have been described in connection with various illustrative embodiments, it is to be understood that other similar embodiments may be used or modifications and additions may be made to the described embodiments for performing the same function disclosed herein without deviating there from. The embodiments described above are not necessarily in the alternative, as various embodiments may be combined to provide the desired characteristics. Therefore, the composite insulating film and methods should not be limited to any single embodiment, but rather construed in breadth and scope in accordance with the recitation of the appended claims.

The invention claimed is:

1. A composite insulating film comprising:
   a base polyester film layer having opposite facing major surfaces, and
   a partially cured poly(amide)imide film layer cast onto both opposite facing major surfaces of said base polyester film layer in direct adjacent contact with said opposite facing major surfaces of said base polyester film layer, wherein said composite insulating film is flexible and self-supporting, and wherein said composite insulating film exhibits a thermal index up to about 220° C.

2. The composite insulating film of claim 1, wherein said polyester film layer is selected from the group consisting of polyethylene terephthalate, polyethylene naphthalate, and polybutylene terephthalate.

3. The composite insulating film of claim 2, wherein said polyester film layer comprises polyethylene terephthalate.

4. The composite insulating film of claim 3, having a thickness from about 2.5 mils to about 16 mils.

5. The composite insulating film of claim 4, wherein the thickness of said partially cured poly(amide)imide layer is about 0.5 mil to about 2 mils.

6. An electric motor or transformer comprising:
   a component to be insulated; and
   a flexible and self-supporting composite insulating film comprising a base polyester film layer having opposite facing major surfaces, and a partially cured poly(amide)imide film layer cast onto both opposite facing major surfaces of said base polyester film layer in direct adjacent contact with said opposite facing major surfaces of said base polyester film layer adjacent said component, wherein said composite insulating film exhibits a thermal index up to about 220° C.

* * * * *